(12) United States Patent
Hancock et al.

(10) Patent No.: US 12,148,889 B2
(45) Date of Patent: Nov. 19, 2024

(54) NON-AQUEOUS ELECTROLYTE INCLUDING LITHIUM BIS(FLUOROSULFONYL)IMIDE, FLUORINATED ACYCLIC CARBOXYLIC ACID ESTER, ORGANIC CARBONATE AND ELECTROLYTE SALT

(71) Applicants: SYENSQO SA, Brussels (BE); Margaret A. Hancock

(72) Inventors: Daniel Hancock, Media, PA (US); Du-Hyun Won, Cheongju-si (KR); Hyuncheol Lee, Gyeonggi-do (KR); Hyung Kwon Hwang, Seoul (KR); Eun-Ji Moon, Seoul (KR)

(73) Assignee: SYENSQO SA, Brussels (BE)

( * ) Notice: Subject to any disclaimer, the term of this patent is extended or adjusted under 35 U.S.C. 154(b) by 936 days.

(21) Appl. No.: 16/960,594

(22) PCT Filed: Jan. 11, 2019

(86) PCT No.: PCT/EP2019/050660
§ 371 (c)(1),
(2) Date: Jul. 8, 2020

(87) PCT Pub. No.: WO2019/138056
PCT Pub. Date: Jul. 18, 2019

(65) Prior Publication Data
US 2020/0335825 A1 Oct. 22, 2020

Related U.S. Application Data

(60) Provisional application No. 62/616,510, filed on Jan. 12, 2018.

(30) Foreign Application Priority Data

Feb. 27, 2018 (EP) .................................... 18158776

(51) Int. Cl.
H01M 10/0569 (2010.01)
H01M 10/0525 (2010.01)
(Continued)

(52) U.S. Cl.
CPC ... *H01M 10/0569* (2013.01); *H01M 10/0525* (2013.01); *H01M 10/0567* (2013.01); *H01M 10/0568* (2013.01); *H01M 2300/0034* (2013.01)

(58) Field of Classification Search
CPC ......... H01M 10/0569; H01M 10/0567; H01M 10/0568; H01M 10/0525
(Continued)

(56) References Cited

U.S. PATENT DOCUMENTS 5,738,957 A   4/1998  Amine et al.
5,962,166 A  10/1999  Ein-Eli et al.
(Continued)

FOREIGN PATENT DOCUMENTS

CN   101882696 A  * 11/2010
CN   103579677 A  *  2/2014
(Continued)

OTHER PUBLICATIONS

Liu et al, "Understanding the Improved Electrochemical Performances of Fe-Substituted 5 V Spinel Cathode LiMn1.5Ni0.5O4", J. Phys. Chem. C, 2009, vol. 113, No. 33, pp. 15073-15079.
(Continued)

Primary Examiner — Sean P Cullen
(74) Attorney, Agent, or Firm — Osha Bergman Watanabe & Burton LLP

(57) ABSTRACT

Disclosed are electrolyte compositions comprising a fluorinated acyclic carboxylic acid ester, lithium bis(fluorosulfonyl)imide (also called LiFSI); and at least one electrolyte
(Continued)

salt. The electrolyte compositions are useful in electrochemical cells, such as lithium-ion batteries.

14 Claims, 2 Drawing Sheets

(51) Int. Cl.
    *H01M 10/0567*      (2010.01)
    *H01M 10/0568*      (2010.01)

(58) Field of Classification Search
    USPC .................................. 429/323, 326, 332, 343
    See application file for complete search history.

(56) References Cited

U.S. PATENT DOCUMENTS

| | | |
|---|---|---|
| 6,680,145 B2 | 1/2004 | Obrovac et al. |
| 6,964,828 B2 | 11/2005 | Lu et al. |
| 7,026,070 B2 | 4/2006 | Noguchi et al. |
| 7,078,128 B2 | 7/2006 | Lu et al. |
| 7,303,840 B2 | 12/2007 | Thackeray et al. |
| 7,381,496 B2 | 6/2008 | Onnerud et al. |
| 7,468,223 B2 | 12/2008 | Thackeray et al. |
| 7,541,114 B2 | 6/2009 | Ohzuku et al. |
| 7,718,319 B2 | 5/2010 | Manthiram et al. |
| 7,981,544 B2 | 7/2011 | Morishima |
| 8,389,160 B2 | 3/2013 | Venkatachalam et al. |
| 8,394,534 B2 | 3/2013 | Lopez et al. |
| 8,518,525 B2 | 8/2013 | Dennes et al. |
| 8,535,832 B2 | 9/2013 | Karthikeyan et al. |
| 2011/0020700 A1* | 1/2011 | Iwaya ............... H01M 10/0567 429/200 |
| 2011/0183218 A1 | 7/2011 | Odani et al. |
| 2014/0227584 A1* | 8/2014 | Holstein ........... H01M 10/0525 429/163 |
| 2014/0248529 A1* | 9/2014 | Chen .................... H01M 4/505 429/163 |
| 2014/0272555 A1* | 9/2014 | Roelofs ............ H01M 10/0525 429/223 |
| 2014/0302401 A1* | 10/2014 | Burkhardt ............ H01M 4/505 429/333 |
| 2014/0322616 A1* | 10/2014 | Onozaki ........... H01M 10/0569 429/327 |
| 2015/0140443 A1* | 5/2015 | Takahashi ............ H01M 4/505 29/623.5 |
| 2017/0084951 A1* | 3/2017 | Dubois ................ H01M 4/525 |
| 2017/0187068 A1 | 6/2017 | Morisawa et al. |
| 2017/0214091 A1* | 7/2017 | Abe ...................... H01G 11/50 |

FOREIGN PATENT DOCUMENTS

| | | | | |
|---|---|---|---|---|
| CN | 106025307 A | | 10/2016 | |
| CN | 107359369 A | * | 11/2017 | ........ H01M 10/0525 |
| CN | 107681197 A | | 2/2018 | |
| CN | 109473717 A | * | 3/2019 | ........ H01M 10/0525 |
| EP | 2741362 A1 | | 6/2014 | |
| EP | 2858164 A1 | | 4/2015 | |
| EP | 3076473 A1 | | 10/2016 | |
| JP | 2015065131 A | * | 4/2015 | |
| JP | 2016178126 A1 | | 10/2016 | |
| JP | 2018092785 A | * | 6/2018 | |
| JP | 2018101612 A | * | 6/2018 | |
| WO | 2009040367 A1 | | 4/2009 | |
| WO | 2015073419 A1 | | 5/2015 | |
| WO | WO-2016017809 A1 | * | 2/2016 | ............. H01G 11/06 |
| WO | WO-2018011062 A2 | * | 1/2018 | ........... H01M 10/052 |

OTHER PUBLICATIONS

Yoon et al, "Sb—MOx—C (M=Al, Ti, or Mo) Nanocomposite Anodes for Lithium-Ion Batteries," Chem. Mater. 2009, vol. 21, pp. 3898-3904.

* cited by examiner

NON-AQUEOUS ELECTROLYTE INCLUDING LITHIUM BIS(FLUOROSULFONYL)IMIDE, FLUORINATED ACYCLIC CARBOXYLIC ACID ESTER, ORGANIC CARBONATE AND ELECTROLYTE SALT

This application is a U.S. national phase entry under 35 U.S.C. § 371 of International Application No. PCT/EP2019/050660, filed on Jan. 11, 2019, which claims priority to U.S. Provisional Application No. 62/616,510, filed on Jan. 12, 2018 and to European Application No. 18158776.7, filed on Feb. 27, 2018. The entire contents of these applications are explicitly incorporated herein by this reference.

TECHNICAL FIELD OF THE INVENTION

The present invention relates to electrolyte compositions comprising lithium bis(fluorosulfonyl)imide (also called LiFSI). The electrolyte compositions are useful in electrochemical cells, such as lithium ion batteries.

BACKGROUND

Batteries containing electrodes made from alkali metals, alkaline earth metals, or compounds comprising these metals (for example lithium ion batteries) typically incorporate electrolyte salts, additives and non-aqueous solvents for the electrolytes used in the batteries. Additives can enhance the performance and safety of the battery, and therefore a suitable solvent must dissolve the electrolyte salt as well as the additives. The solvent must also be stable under the conditions prevalent in an active battery system.

Electrolyte solvents used in lithium ion batteries typically incorporate organic carbonate compounds or mixtures, and typically include one or more linear carbonates such as, for example, ethyl methyl carbonate, dimethyl carbonate, or diethyl carbonate or cyclic carbonate. However, at cathode potentials above about 4.35 V these electrolyte solvents can decompose, which can result in a loss of battery performance.

Various approaches have been investigated to overcome the limitations of commonly used non-aqueous electrolyte solvents, by changing the solvent and/or by adding additives to the electrolyte formulation.

The patent application US 2017/0187068 discloses a non-aqueous electrolyte for secondary cells containing lithium bis(fluorosulfonyl)amide and a specific fluorinated chain carboxylic acid ester having hydrogen at its alpha position and fluorine at its beta position of the main chain provided by the corresponding carboxylic acid.

The international patent application WO 2015/073419 discloses electrolytic solutions useful for secondary batteries containing lithium bis(fluorosulfonyl)imide and assymetric borates, asymmetric phosphates and mixtures thereof.

The Chinese patent application CN 106025307 A discloses electrolytes for lithium-ion battery including organic solvent and a mixture of the lithium salts LiFSI and LiClO.

However, there remains a need for a formulation that combines solvent(s) with additive(s) that, when used in a lithium ion battery, can exhibit high cycle performance at low and high temperature, storage performance at high temperature, and power at low temperature.

SUMMARY OF THE INVENTION

Here is disclosed an electrolyte composition comprising:
a fluorinated solvent,
lithium bis(fluorosulfonyl)imide; and
at least one electrolyte salt.

More specifically, the present invention relates in a first aspect to an electrolyte composition comprising:
a fluorinated solvent,
lithium bis(fluorosulfonyl)imide; and
at least one electrolyte salt.
wherein the fluorinated solvent is an acyclic carboxylic acid esters represented by the formula:

$R^1$—COO—$R^2$ wherein
i) $R^1$ is an alkyl group;
ii) $R^2$ is a fluoroalkyl group; and
iii) $R^1$ and $R^2$, taken as a pair, comprise at least two carbon atoms but not more than seven carbon atoms.

In another aspect, there is disclosed an electrochemical cell comprising:
(a) a housing;
(b) an anode and a cathode disposed in the housing and in ionically conductive contact with one another;
(c) the electrolyte composition comprising:
a fluorinated solvent as defined above,
lithium bis(fluorosulfonyl)imide; and
at least one electrolyte salt.

In another aspect, there is disclosed an electronic device, transportation device, or telecommunications device, comprising an electrochemical cell as defined above.

In another aspect, there is provided a method for forming an electrolyte composition as defined above, wherein said method comprises combining a) a fluorinated solvent as defined above; b) lithium bis(fluorosulfonyl)imide, and c) at least one electrolyte salt to form the electrolyte composition.

Finally, in another aspect, there is provided the use of lithium bis(fluorosulfonyl)imide for improving cycle performance at low and high temperature, and/or storage performance at high temperature, of a lithium ion battery.

DETAILS DESCRIPTION OF THE INVENTION

Figure 1:
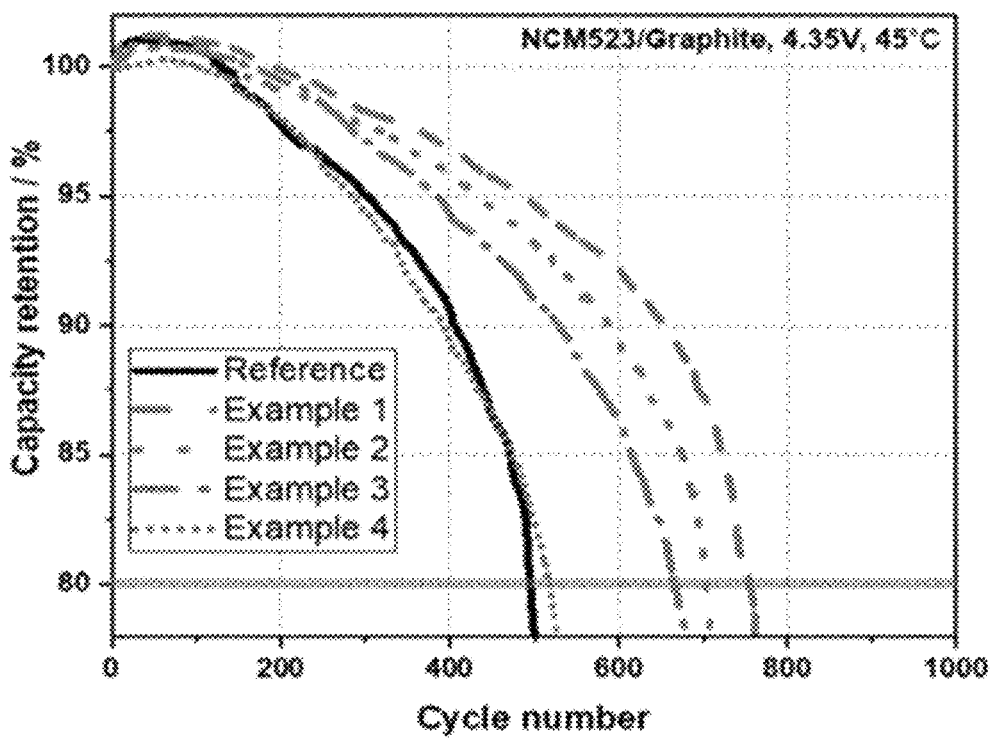
FIG. 1 shows the results of the cycling tests at high temperature (45° C.) of the cells according to the examples.

As used above and throughout the disclosure, the following terms, unless otherwise indicated, shall be defined as follows:

The term "electrolyte composition" as used herein, refers to a chemical composition that includes, at a minimum, a solvent for an electrolyte salt and an electrolyte salt, wherein the composition is capable of supplying an electrolyte in an electrochemical cell. An electrolyte composition can include other components, for example additives to enhance the performance of the battery in safety, reliability, and or efficiency.

The term "electrolyte salt" as used herein, refers to an ionic salt that is at least partially soluble in the solvent of the electrolyte composition and that at least partially dissociates into ions in the solvent of the electrolyte composition to form a conductive electrolyte composition.

An "electrolyte solvent" as defined herein is a solvent or a solvent mixture for an electrolyte composition.

The term "anode" refers to the electrode of an electrochemical cell, at which oxidation occurs. In a secondary (i.e. rechargeable) battery, the anode is the electrode at which oxidation occurs during discharge and reduction occurs during charging.

The term "cathode" refers to the electrode of an electrochemical cell, at which reduction occurs. In a secondary (i.e. rechargeable) battery, the cathode is the electrode at which reduction occurs during discharge and oxidation occurs during charging.

The term "lithium ion battery" refers to a type of rechargeable battery in which lithium ions move from the anode to the cathode during discharge and from the cathode to the anode during charge.

The equilibrium potential between lithium and lithium ion is the potential of a reference electrode using lithium metal in contact with the non-aqueous electrolyte containing lithium salt at a concentration sufficient to give about 1 mole/liter of lithium ion concentration, and subjected to sufficiently small currents so that the potential of the reference electrode is not significantly altered from its equilibrium value (Li/Li$^+$). The potential of such a Li/Li$^+$ reference electrode is assigned here the value of 0.0V. Potential of an anode or cathode means the potential difference between the anode or cathode and that of a Li/Li$^+$ reference electrode. Herein voltage means the voltage difference between the cathode and the anode of a cell, neither electrode of which may be operating at a potential of 0.0V.

An "energy storage device" is a device that is designed to provide electrical energy on demand, such as a battery or a capacitor. Energy storage devices contemplated herein at least in part provide energy from electrochemical sources.

The term "SEI", as used herein, refers to a solid electrolyte interphase layer formed on the active material of an electrode. A lithium-ion secondary electrochemical cell is assembled in an uncharged state and must be charged (a process called formation) for use. During the first few charging events (battery formation) of a lithium-ion secondary electrochemical cell, components of the electrolyte are reduced or otherwise decomposed or incorporated onto the surface of the negative active material and oxidized or otherwise decomposed or incorporated onto the surface of the positive active material, electrochemically forming a solid-electrolyte interphase on the active materials. These layers, which are electrically insulating but ionically conducting, help prevent decomposition of the electrolyte and can extend the cycle life and improve the performance of the battery. On the anode, the SEI can suppress the reductive decomposition of the electrolyte; on the cathode, the SEI can suppress the oxidation of the electrolyte components.

The term "alkyl group", as used herein, refers to linear or branched, straight or cyclic hydrocarbon groups containing from 1 to 20 carbons, preferably from 1 to 6 carbons, more preferably from 1 to 4 carbons, and containing no unsaturation. Examples of straight chain alkyl radicals include methyl, ethyl, propyl, butyl, pentyl, hexyl, heptyl, octyl, nonyl, decyl, undecyl, and dodecyl. Examples of branched chain isomers of straight chain alkyl groups include isopropyl, iso-butyl, tert-butyl, sec-butyl, isopentyl, neopentyl, isohexyl, neohexyl, and isooctyl. Examples of cyclic alkyl groups include cyclopropyl, cyclobutyl, cyclopentyl, cyclohexyl, cycloheptyl, and cyclooctyl.

The term "fluoroalkyl group", as used herein, refers to an alkyl group wherein at least one hydrogen is replaced by fluorine.

The term "alkenyl group", as used herein, refers to linear or branched, straight or cyclic groups as described with respect to alkyl group as defined herein, except that at least one double bond exists between two carbon atoms. Examples of alkenyl groups include vinyl, cyclohexenyl, cyclopentenyl, cyclohexadienyl, and butadienyl.

The term "alkynyl group", as used herein, refers to linear or branched, straight or cyclic groups as described with respect to alkyl group as defined herein, except that at least one triple bond exists between two carbon atoms.

The term "carbonate" as used herein refers specifically to an organic carbonate, wherein the organic carbonate is a dialkyl diester derivative of carbonic acid, the organic carbonate having a general formula $R^aOCOOR^b$, wherein $R^a$ and $R^b$ are each independently selected from alkyl groups having at least one carbon atom, wherein the alkyl substituents can be the same or different, can be saturated or unsaturated, substituted or unsubstituted, can form a cyclic structure via interconnected atoms, or include a cyclic structure as a substituent of either or both of the alkyl groups.

Unless otherwise specified, all percentages are percentages by weight and are based on the total weight of the electrolyte composition.

The electrolyte compositions according to the present invention comprise lithium bis(fluorosulfonyl)imide (LiFSI).

LiFSI may be present in the electrolyte composition in the range of from 0.1 to about 30 percent by weight, based on the total weight of the electrolyte composition, preferably in the range of from 0.1 to about 20 percent by weight, more preferably from 0.1 to about 10 percent by weight, more preferably from 0.3 to about 5.0 percent by weight, and even more preferably from 0.5 to 2.0 percent by weight.

LiFSI can be obtained commercially or prepared by methods known in the art.

The electrolyte compositions according to the present invention also comprise an electrolyte salt. Suitable electrolyte salts include without limitation:

lithium hexafluorophosphate (LiPF$_6$),
lithium difluorophosphate (LiPO$_2$F$_2$),
lithium bis(trifluoromethyl)tetrafluorophosphate (LiPF$_4$(CP$_3$)$_2$),
lithium bis(pentafluoroethyl)tetrafluorophosphate (LiPF$_4$(C$_2$F$_5$)$_2$),
lithium tris(pentafluoroethyl)trifluorophosphate (LiPF$_3$(C$_2$F$_5$)$_3$),
lithium bis(trifluoromethanesulfonyl)imide,
lithium bis(perfluoroethanesulfonyl)imide,
lithium (fluorosulfonyl) (nonafluorobutanesulfonyl)imide,
lithium tetrafluoroborate,
lithium perchlorate,
lithium hexafluoroarsenate,
lithium trifluoromethanesulfonate,
lithium tris(trifluoromethanesulfonyl)methide,
lithium bis(oxalato)borate,
lithium difluoro(oxalato)borate,
Li$_2$B$_{12}$F$_{12-x}$H$_x$ where x is equal to 0 to 8, and
mixtures of lithium fluoride and anion receptors such as B(OC$_6$F$_5$)$_3$.

As used herein, the electrolyte salt is different from lithium bis(fluorosulfonyl)imide.

Mixtures of two or more of these or comparable electrolyte salts may also be used. According to a preferred embodiment, the electrolyte salt comprises lithium hexafluorophosphate $LiPF_6$. Alternatively, the electrolyte salt comprises lithium bis(trifluoromethanesulfonyl)imide LiTFSI. The electrolyte salt can be present in the electrolyte composition in an amount from about 0.2 M to about 2.0 M, for example from about 0.3 M to about 1.7 M, or for example from about 0.5 M to about 1.2 M, or for example 0.5 M to about 1.7 M.

The electrolyte compositions according to the present invention also comprise one or more fluorinated solvents. According to one preferred embodiment, the fluorinated solvent is selected from fluorinated acyclic carboxylic acid esters.

Suitable fluorinated acyclic carboxylic acid esters may be represented by the formula:

$R^1$—COO—$R^2$ wherein
i) $R^1$ is an alkyl group;
ii) $R^2$ is a fluoroalkyl group; and
iii) $R^1$ and $R^2$, taken as a pair, comprise at least two carbon atoms but not more than seven carbon atoms.

In one embodiment, $R^1$ comprises one carbon atom. In one embodiment, $R^1$ comprises two carbon atoms.

In another embodiment, $R^1$ and $R^2$ are as defined herein above, and $R^1$ and $R^2$, taken as a pair, comprise at least two carbon atoms but not more than seven carbon atoms and further comprise at least two fluorine atoms, with the proviso that neither $R^1$ nor $R^2$ contains a $FCH_2$— group or a —FCH— group.

In one embodiment, the number of carbon atoms in $R^1$ in the formula above is 1, 3, 4, or 5.

In another embodiment, the number of carbon atoms in $R^1$ in the formula above is 1.

Examples of suitable fluorinated acyclic carboxylic acid esters include without limitation $CH_3$—COO—$CH_2CF_2H$ (2,2-difluoroethyl acetate, CAS No. 1550-44-3), $CH_3$—COO—$CH_2CF_3$ (2,2,2-trifluoroethyl acetate, CAS No. 406-95-1), $CH_3CH_2$—COO—$CH_2CF_2H$ (2,2-difluoroethyl propionate, CAS No. 1133129-90-4), $CH_3$—COO—$CH_2CH_2CF_2H$ (3,3-difluoropropyl acetate), $CH_3CH_2$—COO—$CH_2CH_2CF_2H$ (3,3-difluoropropyl propionate), and mixtures thereof. According to a preferred embodiment, the fluorinated acyclic carboxylic acid ester comprises 2,2-difluoroethyl acetate ($CH_3$—COO—$CH_2CF_2H$). According to another preferred embodiment, the fluorinated acyclic carboxylic acid ester comprises 2,2-difluoroethyl propionate ($CH_3CH_2$—COO—$CH_2CF_2H$). According to another preferred embodiment, the fluorinated acyclic carboxylic acid ester comprises 2,2,2-trifluoroethyl acetate ($CH_3$—COO—$CH_2CF_3$).

More generally, here is further disclosed that the fluorinated solvent may be at least one fluorinated solvent selected from fluorinated acyclic carboxylic acid esters, fluorinated acyclic carbonates, and fluorinated acyclic ethers.

Fluorinated acyclic carboxylic acid esters may be represented by the formula:

$R^1$—COO—$R^2$ wherein
i) $R^1$ is H, an alkyl group, or a fluoroalkyl group;
ii) $R^2$ is an alkyl group or a fluoroalkyl group;
iii) either or both of $R^1$ and $R^2$ comprises fluorine; and
iv) $R^1$ and $R^2$, taken as a pair, comprise at least two carbon atoms but not more than seven carbon atoms.

In one embodiment, $R^1$ is H and $R^2$ is a fluoroalkyl group. In one embodiment, $R^1$ is an alkyl group and $R^2$ is a fluoroalkyl group. In one embodiment, $R^1$ is a fluoroalkyl group and $R^2$ is an alkyl group. In one embodiment, $R^1$ is a fluoroalkyl group and $R^2$ is a fluoroalkyl group, and $R^1$ and $R^2$ can be either the same as or different from each other. In one embodiment, $R^1$ comprises one carbon atom. In one embodiment, $R^1$ comprises two carbon atoms.

In another embodiment, $R^1$ and $R^2$ are as defined herein above, and $R^1$ and $R^2$, taken as a pair, comprise at least two carbon atoms but not more than seven carbon atoms and further comprise at least two fluorine atoms, with the proviso that neither $R^1$ nor $R^2$ contains a $FCH_2$— group or a —FCH— group.

In one embodiment, the number of carbon atoms in $R^1$ in the formula above is 1, 3, 4, or 5.

In another embodiment, the number of carbon atoms in $R^1$ in the formula above is 1.

Examples of suitable fluorinated acyclic carboxylic acid esters include without limitation $CH_3$—COO—$CH_2CF_2H$ (2,2-difluoroethyl acetate, CAS No. 1550-44-3), $CH_3$—COO—$CH_2CF_3$ (2,2,2-trifluoroethyl acetate, CAS No. 406-95-1), $CH_3CH_2$—COO—$CH_2CF_2H$ (2,2-difluoroethyl propionate, CAS No. 1133129-90-4), $CH_3$—COO—$CH_2CH_2CF_2H$ (3,3-difluoropropyl acetate), $CH_3CH_2$—COO—$CH_2CH_2CF_2H$ (3,3-difluoropropyl propionate), $F_2CHCH_2$—COO—$CH_3$, $F_2CHCH_2$—COO—$CH_2CH_3$, and $F_2CHCH_2CH_2$—COO—$CH_2CH_3$ (ethyl 4,4-difluorobutanoate, CAS No. 1240725-43-2), H—COO—$CH_2CF_2H$ (difluoroethyl formate, CAS No. 1137875-58-1), H—COO—$CH_2CF_3$ (trifluoroethyl formate, CAS No. 32042-38-9), and mixtures thereof. According to a preferred embodiment, the fluorinated acyclic carboxylic acid ester comprises 2,2-difluoroethyl acetate ($CH_3$—COO—$CH_2CF_2H$). According to another preferred embodiment, the fluorinated acyclic carboxylic acid ester comprises 2,2-difluoroethyl propionate ($CH_3CH_2$—COO—$CH_2CF_2H$). According to another preferred embodiment, the fluorinated acyclic carboxylic acid ester comprises 2,2,2-trifluoroethyl acetate ($CH_3$—COO—$CH_2CF_3$). According to another preferred embodiment, the fluorinated acyclic carboxylic acid ester comprises 2,2-difluoroethyl formate (H—COO—$CH_2CF_2H$).

Suitable fluorinated acyclic carbonates are represented by the formula

$R^3$—OCOO—$R^4$ wherein
i) $R^3$ is a fluoroalkyl group;
ii) $R^4$ is an alkyl group or a fluoroalkyl group; and
iii) $R^3$ and $R^4$ taken as a pair comprise at least two carbon atoms but not more than seven carbon atoms.

In one embodiment, $R^3$ is a fluoroalkyl group and $R^4$ is an alkyl group. In one embodiment, $R^3$ is a fluoroalkyl group and $R^4$ is a fluoroalkyl group, and $R^3$ and $R^4$ can be either the same as or different from each other. In one embodiment, $R^3$ comprises one carbon atom. In one embodiment, $R^3$ comprises two carbon atoms.

In another embodiment, $R^3$ and $R^4$ are as defined herein above, and $R^3$ and $R^4$, taken as a pair, comprise at least two carbon atoms but not more than seven carbon atoms and further comprise at least two fluorine atoms, with the proviso that neither $R^3$ nor $R^4$ contains a $FCH_2$— group or a —FCH— group.

Examples of suitable fluorinated acyclic carbonates include without limitation $CH_3$—OC(O)O—$CH_2CF_2H$ (methyl 2,2-difluoroethyl carbonate, CAS No. 916678-13-

2), CH$_3$—OC(O)O—CH$_2$CF$_3$ (methyl 2,2,2-trifluoroethyl carbonate, CAS No. 156783-95-8), CH$_3$—OC(O)O—CH$_2$CF$_2$CF$_2$H (methyl 2,2,3,3-tetrafluoropropyl carbonate, CAS No. 156783-98-1), HCF$_2$CH$_2$—OCOO—CH$_2$CH$_3$ (ethyl 2,2-difluoroethyl carbonate, CAS No. 916678-14-3), and CF$_3$CH$_2$—OCOO—CH$_2$CH$_3$ (ethyl 2,2,2-trifluoroethyl carbonate, CAS No. 156783-96-9).

Suitable fluorinated acyclic ethers are represented by the formula $$R^5—O—R^6$$

wherein i) $R^5$ is a fluoroalkyl group;
ii) $R^6$ is an alkyl group or a fluoroalkyl group; and
iii) $R^5$ and $R^6$ taken as a pair comprise at least two carbon atoms but not more than seven carbon atoms.

In one embodiment, $R^5$ is a fluoroalkyl group and $R^6$ is an alkyl group. In one embodiment, $R^5$ is a fluoroalkyl group and $R^6$ is a fluoroalkyl group, and $R^5$ and $R^6$ can be either the same as or different from each other. In one embodiment, $R^5$ comprises one carbon atom. In one embodiment, $R^5$ comprises two carbon atoms.

In another embodiment, $R^5$ and $R^6$ are as defined herein above, and $R^5$ and $R^6$, taken as a pair, comprise at least two carbon atoms but not more than seven carbon atoms and further comprise at least two fluorine atoms, with the proviso that neither $R^5$ nor $R^6$ contains a FCH$_2$— group or a —FCH— group.

Examples of suitable fluorinated acyclic ethers include without limitation HCF$_2$CF$_2$CH$_2$—O—CF$_2$CF$_2$H (CAS No. 16627-68-2) and HCF$_2$CH$_2$—O—CF$_2$CF$_2$H (CAS No. 50807-77-7).

The fluorinated solvent may comprise a fluorinated acyclic carboxylic acid ester, a fluorinated acyclic carbonate, a fluorinated acyclic ether, or mixtures thereof. As used herein, the term "mixtures thereof" encompasses both mixtures within and mixtures between solvent classes, for example mixtures of two or more fluorinated acyclic carboxylic acid esters, and also mixtures of fluorinated acyclic carboxylic acid esters and fluorinated acyclic carbonates, for example. Non-limiting examples include a mixture of 2,2-difluoroethyl acetate and 2,2-difluoroethyl propionate; and a mixture of 2,2-difluoroethyl acetate and 2,2 difluoroethyl methyl carbonate.

In one embodiment, the fluorinated solvent is:
a) a fluorinated acyclic carboxylic acid ester represented by the formula:

$$R^1—COO—R^2,$$

b) a fluorinated acyclic carbonate represented by the formula:

$$R^3—OCOO—R^4,$$

c) a fluorinated acyclic ether represented by the formula:

$$R^5—O—R^6,$$

or a mixture thereof;
wherein
i) $R^1$ is H, an alkyl group, or a fluoroalkyl group;
ii) $R^3$ and $R^5$ is each independently a fluoroalkyl group and can be either the same as or different from each other;
iii) $R^2$, $R^4$, and $R^6$ is each independently an alkyl group or a fluoroalkyl group and can be either the same as or different from each other;

iv) either or both of $R^1$ and $R^2$ comprises fluorine; and
v) $R^1$ and $R^2$, $R^3$ and $R^4$, and $R^5$ and $R^6$, each taken as a pair, comprise at least two carbon atoms but not more than seven carbon atoms.

Preferably, none of $R^1$, $R^2$, $R^3$, $R^4$, $R^5$, nor $R^6$ contains a FCH2— group or a —FCH— group.

In another embodiment, $R^1$ and $R^3$ in the formula above do not contain fluorine, and $R^2$ and $R^4$ contain fluorine.

In the electrolyte compositions disclosed herein, the fluorinated solvent or mixtures thereof can be used in various amounts depending on the desired properties of the electrolyte composition. The fluorinated solvent may represent about 5% to about 95%, preferably about 10% to about 80%, more preferably about 20% to about 75%, more preferably about 30% to about 70%, even more preferably about 50% to about 70%, by weight of the electrolyte composition. In another embodiment, the fluorinated solvent comprises about 45% to about 65% by weight of the electrolyte composition. In another embodiment, the fluorinated solvent comprises about 6% to about 30% by weight of the electrolyte composition. In another embodiment, the fluorinated solvent comprises about 60% to about 65% by weight of the electrolyte composition. In another embodiment, the fluorinated solvent comprises about 20% to about 45% by weight of the electrolyte composition.

Fluorinated acyclic carboxylic acid esters, fluorinated acyclic carbonates, and fluorinated acyclic ethers suitable for use herein may be prepared using known methods. For example, acetyl chloride may be reacted with 2,2-difluoroethanol (with or without a basic catalyst) to form 2,2-difluoroethyl acetate. Additionally, 2,2-difluoroethyl acetate and 2,2-difluoroethyl propionate may be prepared using the method described by Wiesenhofer et al. (WO 2009/040367 A1, Example 5). Alternatively, 2,2-difluoroethyl acetate can be prepared using the method described in the Examples herein below. Other fluorinated acyclic carboxylic acid esters may be prepared using the same method using different starting carboxylate salts. Similarly, methyl chloroformate may be reacted with 2,2-difluoroethanol to form methyl 2,2-difluoroethyl carbonate. Synthesis of HCF$_2$CF$_2$CH$_2$—O—CF$_2$CF$_2$H can be done by reacting 2,2,3,3-tetrafluoropropanol with tetrafluoroethylene in the presence of base (e.g., NaH, etc.). Similarly, reaction of 2,2-difluoroethanol with tetrafluoroethylene yields HCF$_2$CH$_2$—O—CF$_2$CF$_2$H. Alternatively, some of these fluorinated solvents may be purchased from companies such as Matrix Scientific (Columbia SC). For best results, it is desirable to purify the fluorinated acyclic carboxylic esters and fluorinated acyclic carbonates to a purity level of at least about 99.9%, more particularly at least about 99.99%. These fluorinated solvents may be purified using distillation methods such as vacuum distillation or spinning band distillation.

The electrolyte composition may further comprise one or more organic carbonates, which can be fluorinated or non-fluorinated, linear or cyclic. Suitable organic carbonates can include, for example: fluoroethylene carbonate, which is also known as 4-fluoro-1,3-dioxolan-2-one, all isomers of trifluoroethylene carbonate; ethylene carbonate, also known as 1,3-dioxalan-2-one; ethyl methyl carbonate; all isomers of difluoroethylene carbonate including 4,5-difluoro-1,3-dioxolan-2-one; 4,5-difluoro-4-methyl-1,3-dioxolan-2-one; 4,5-difluoro-4,5-dimethyl-1,3-dioxolan-2-one; 4,4-difluoro-1,3-dioxolan-2-one; 4,4,5-trifluoro-1,3-dioxolan-2-one; tetrafluoroethylene carbonate; dimethyl carbonate; diethyl carbonate; propylene carbonate; vinylene carbonate; di-tert-butyl carbonate; 2,2,3,3-tetrafluoropropyl methyl carbonate; bis(2,2,3,3-tetrafluoropropyl) carbonate; bis(2,2,2-trifluoroethyl) carbonate; 2,2,2-trifluoroethyl methyl carbonate; bis (2,2-difluoroethyl) carbonate; 2,2-difluoroethyl methyl carbonate; dipropyl carbonate; methyl propyl carbonate; ethyl propyl vinylene carbonate; methyl butyl carbonate; ethyl butyl carbonate; propyl butyl carbonate; dibutyl carbonate; vinyl ethylene carbonate; dimethylvinylene carbonate; 2,3, 3-trifluoroallyl methyl carbonate; or mixtures thereof. It is desirable to use a carbonate that is battery grade or has a purity level of at least about 99.9%, for example at least about 99.99%. Organic carbonates are available commercially or may be prepared by methods known in the art.

In some embodiments, the electrolyte composition further comprises a cyclic carbonate. In one embodiment, the cyclic carbonate comprises fluoroethylene carbonate. In one embodiment, the cyclic carbonate comprises ethylene carbonate. In one embodiment, the cyclic carbonate comprises propylene carbonate. In one embodiment, the cyclic carbonate comprises fluoroethylene carbonate and ethylene carbonate. In one embodiment, the cyclic carbonate comprises fluoroethylene carbonate and propylene carbonate.

The one or more organic carbonates can be used in various amounts depending on the desired properties of the electrolyte composition. The one or more organic carbonate may be present in the electrolyte composition in the range of from about 0.5% to about 95%, preferably about 5% to about 95%, more preferably about 10% to about 80%, more preferably about 20% to about 40%, even more preferably about 25% to about 35%, by weight of the electrolyte composition. In another embodiment, the organic carbonate(s) comprises about 0.5% to about 10% by weight of the electrolyte composition, or about 1% to about 10%, or about 5% to about 10%. All percentages by weight are based on the total weight of the electrolyte composition.

Optionally, an electrolyte composition as described herein may further comprise an additive such as a lithium boron compound, a cyclic sultone, a cyclic sulfate, a cyclic carboxylic acid anhydride, or a combination thereof.

In some embodiments, the electrolyte composition further comprises a lithium boron compound. Suitable lithium boron compounds include lithium terafluoroborate, lithium bis(oxalato)borate, lithium difluoro(oxalato)borate, other lithium boron salts, $Li_2B_{12}F_{12-x}H_x$, wherein x is 0 to 8, mixtures of lithium fluoride and anion receptors such as $B(OC_6F_5)_3$, or mixtures thereof. According to a preferred embodiment, the electrolyte composition of the invention additionally comprises at least one lithium borate salt selected from lithium bis(oxalato)borate, lithium difluoro(oxalato)borate, lithium tetrafluoroborate, or mixtures thereof, preferably lithium bis(oxalato)borate. The lithium borate compound may be present in the electrolyte composition in the range of from 0.1 to about 10 percent by weight, based on the total weight of the electrolyte composition, for example in the range of from 0.1 to about 5.0 percent by weight, or from 0.3 to about 4.0 percent by weight, or from 0.5 to 2.0 percent by weight. The lithium boron compounds can be obtained commercially or prepared by methods known in the art.

In some embodiments, the electrolyte composition further comprises a cyclic sultone. Suitable sultones include those represented by the formula:

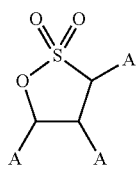

wherein each A is independently a hydrogen, fluorine, or an optionally fluorinated alkyl, vinyl, allyl, acetylenic, or propargyl group. The vinyl ($H_2C=CH—$), allyl ($H_2C=CH—CH_2—$), acetylenic ($HC\square C—$), or propargyl ($HC\square C—CH_2—$) groups may each be unsubstituted or partially or totally fluorinated. Each A can be the same or different as one or more of the other A groups, and two or three of the A groups can together form a ring. Mixtures of two or more of sultones may also be used. Suitable sultones include 1,3-propane sultone, 3-fluoro-1,3-propane sultone, 4-fluoro-1,3-propane sultone, 5-fluoro-1,3-propane sultone, and 1,8-naphthalenesultone. According to a preferred embodiment, the sultone comprises 1,3-propane sultone or 3-fluoro-1,3-propane sultone, preferably 1,3-propane sultone.

In one embodiment the sultone is present at about 0.01 to about 10 weight percent, or about 0.1 weight percent to about 5 weight percent, or about 0.5 weight percent to about 3 weight percent, or about 1 weight percent to about 3 weight percent or about 1.5 weight percent to about 2.5 weight percent, or about 2 weight percent, of the total electrolyte composition.

In some embodiments, the electrolyte composition further comprises a cyclic sulfate represented by the formula:

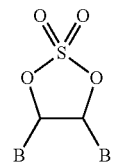

wherein each B is independently a hydrogen or an optionally fluorinated vinyl, allyl, acetylenic, propargyl, or $C_1$-$C_3$ alkyl group. The vinyl ($H_2C=CH—$), allyl ($H_2C=CH—CH_2—$), acetylenic ($HC\square C—$), propargyl ($HCC\square CH_2—$), or $C_1$-$C_3$ alkyl groups may each be unsubstituted or partially or totally fluorinated. Mixtures of two or more of cyclic sulfates may also be used. Suitable cyclic sulfates include ethylene sulfate (1,3,2-dioxathiolane-2,2-dioxide), 1,3,2-dioxathiolane-4-ethynyl-2,2-dioxide, 1,3,2-dioxathiolane-4-ethenyl-2,2-dioxide, 1,3,2-dioxathiolane-4,5-diethenyl-2,2-dioxide, 1,3,2-dioxathiolane-4-methyl-2,2-dioxide, and 1,3,2-dioxathiolane-4,5-dimethyl-2,2-dioxide. According to a preferred embodiment, the cyclic sulfate is ethylene sulfate.

In one embodiment, the cyclic sulfate is present at about 0.1 weight percent to about 12 weight percent of the total electrolyte composition, or about 0.5 weight percent to less than about 10 weight percent, about 0.5 weight percent to less than about 5 weight percent, or about 0.5 weight percent to about 3 weight percent, or about 0.5 weight percent to about 2 weight percent, or about 2 weight percent to about 3 weight percent. In one embodiment the cyclic sulfate is present at about 1 weight percent to about 3 weight percent or about 1.5 weight percent to about 2.5 weight percent, or about 2 weight percent of the total electrolyte composition.

In some embodiments, the electrolyte composition further comprises a cyclic carboxylic acid anhydride. Suitable cyclic carboxylic acid anhydrides include those selected from the group consisting of the compounds represented by Formula (IV) through Formula (XI):

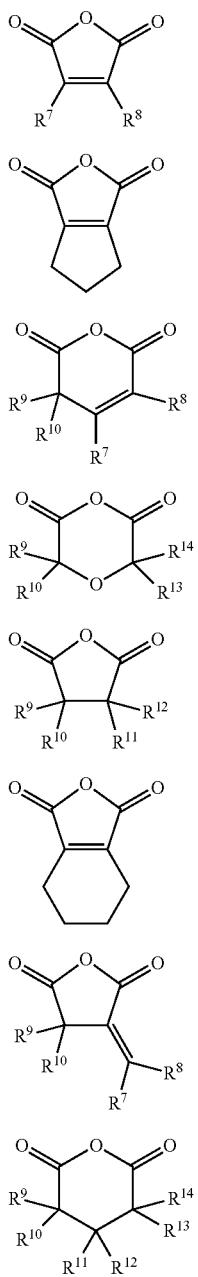

wherein R7 to R14 is each independently H, F, a linear or branched C1 to C10 alkyl radical optionally substituted with F, alkoxy, and/or thioalkyl substituents, a linear or branched C2 to C10 alkene radical, or a C6 to C10 aryl radical. The alkoxy substituents can have from one to ten carbons and can be linear or branched; examples of alkoxy substituents include —OCH3, —OCH2CH3, and —OCH2CH2Chy The thioalkyl substituents can have from one to ten carbons and can be linear or branched; examples of thioalkyl substituents include —SCH3, —SCH2CH3, and —SCH2CH2CH3. Examples of suitable cyclic carboxylic acid anhydrides include maleic anhydride; succinic anhydride; glutaric anhydride; 2,3-dimethylmaleic anhydride; citraconic anhydride; 1-cyclopentene-1,2-dicarboxylic anhydride; 2,3-diphenyl-maleic anhydride; 3,4,5,6-tetrahydrophthalic anhydride; 2,3-dihydro-1,4-dithiiono-[2,3-c] furan-5,7-dione; and phe-nylmaleic anhydride. A mixture of two or more of these cyclic carboxylic acid anhydrides can also be used. According to a preferred embodiment, the cyclic carboxylic acid anhydride comprises maleic anhydride. In one embodiment, the cyclic carboxylic acid anhydride comprises maleic anhydride, succinic anhydride, glutaric anhydride, 2,3-dimethyl-maleic anhydride, citraconic anhydride, or mixtures thereof. The cyclic carboxylic acid anhydrides can be obtained from a specialty chemical company such as Sigma-Aldrich, Inc. (Milwaukee, Wis.), or prepared using methods known in the art. It is desirable to purify the cyclic carboxylic acid anhydride to a purity level of at least about 99.0%, for example at least about 99.9%. Purification can be done using methods known in the art.

In some embodiments, the electrolyte composition comprises about 0.1 weight percent to about 5 weight percent of the cyclic carboxylic acid anhydride, based on the total weight of the electrolyte composition.

Optionally, the electrolyte compositions according to the invention can further comprise additives that are known to those of ordinary skill in the art to be useful in conventional electrolyte compositions, particularly for use in lithium ion batteries. For example, electrolyte compositions disclosed herein can also include gas-reduction additives which are useful for reducing the amount of gas generated during charging and discharging of lithium ion batteries. Gas-reduction additives can be used in any effective amount, but can be included to comprise from about 0.05 weight % to about 10 weight %, preferably from about 0.05 weight % to about 5 weight %, more preferably from about 0.5 weight % to about 2 weight %, of the electrolyte composition.

Suitable gas-reduction additives that are known conventionally are, for example: halobenzenes such as fluorobenzene, chlorobenzene, bromobenzene, iodobenzene, or haloalkylbenzenes; 1,3-propane sultone; succinic anhydride; ethynyl sulfonyl benzene; 2-sulfobenzoic acid cyclic anhydride; divinyl sulfone; triphenylphosphate (TPP); diphenyl monobutyl phosphate (DMP); γ-butyrolactone; 2,3-dichloro-1,4-naphthoquinone; 1,2-naphthoquinone; 2,3-dibromo-1,4-naphthoquinone; 3-bromo-1,2-naphthoquinone; 2-acetylfuran; 2-acetyl-5-methylfuran; 2-methyl imidazole 1-(phenylsulfonyl)pyrrole; 2,3-benzofuran; fluoro-cyclotri-phosphazenes such as 2,4,6-trifluoro-2-phenoxy-4,6-dipropoxy-cyclotriphosphazene and 2,4,6-trifluoro-2-(3-(trifluoromethyl)phenoxy)-6-ethoxy-cyclotriphosphazene; benzotriazole; perfluoro ethylene carbonate; anisole; diethylphosphonate; fluoroalkyl-substituted dioxolanes such as 2-trifluoromethyldioxolane and 2,2-bistrifluoromethyl-1,3-dioxolane; trimethylene borate; dihydro-3-hydroxy-4,5,5-trimethyl-2(3H)-furanone; dihydro-2-methoxy-5,5-dimethyl-3(2H)-furanone; dihydro-5,5-dimethyl-2,3-furandione; propene sultone; diglycolic acid anhydride; di-2-propynyl oxalate; 4-hydroxy-3-pentenoic acid γ-lactone; $CF_3COOCH_2C(CH_3)(CH_2OCOCF_3)_2$; $CF_3COOCH_2CF_2CF_2CF_2CF_2CH_2OCOCF_3$; α-methylene-γ-butyrolactone; 3-methyl-2(5H)-furanone; 5,6-dihydro-2-pyranone; diethylene glycol, diacetate; triethylene glycol dimethacrylate; triglycol diacetate; 1,2-ethanedisulfonic anhydride; 1,3-propanedisulfonic anhydride; 2,2,7,7-tetraoxide 1,2,7-oxadithiepane; 3-methyl-2,2,5,5-tetraoxide 1,2,5-oxadithiolane; hexamethoxycyclotriphosphazene; 4,5-dimethyl-4,5-difluoro-1,3-dioxolan-2-one; 2-ethoxy-2,4,4,6,6-pentafluoro-2,2,4,4,6,6-hexahydro-1,3,5,2,4,6-triazatri-phosphorine; 2,2,4,4,6-pentafluoro-2,2,4,4,6,6-hexahydro-6-methoxy-1,3,5,2,4,6-triazatriphosphorine; 4,5-difluoro-1,3-dioxolan-2-one; 1,4-bis(ethenylsulfonyl)-butane; bis (vinylsulfonyl)-methane; 1,3-bis(ethenylsulfonyl)-propane;

1,2-bis(ethenylsulfonyl)-ethane; ethylene carbonate; diethyl carbonate; dimethyl carbonate; ethyl methyl carbonate; and 1,1'-[oxybis(methylenesulfonyl)]bis-ethene.

Other suitable additives that can be used are HF scavengers, such as silanes, silazanes (Si—NH—Si), epoxides, amines, aziridines (containing two carbons), salts of carbonic acid lithium oxalate, $B_2O_5$, ZnO, and fluorinated inorganic salts.

In another embodiment, there is provided herein an electrochemical cell comprising a housing, an anode and a cathode disposed in the housing and in ionically conductive contact with one another, an electrolyte composition, as described herein above providing an ionically conductive pathway between the anode and the cathode, and a porous or microporous separator between the anode and the cathode. According to a preferred embodiment, the electrochemical cell is a lithium ion battery.

The housing may be any suitable container to house the electrochemical cell components. Housing materials are well-known in the art and can include, for example, metal and polymeric housings. While the shape of the housing is not particularly important, suitable housings can be fabricated in the shape of a small or large cylinder, a prismatic case, or a pouch. The anode and the cathode may be comprised of any suitable conducting material depending on the type of electrochemical cell. Suitable examples of anode materials include without limitation lithium metal, lithium metal alloys, lithium titanate, aluminum, platinum, palladium, graphite, transition metal oxides, and lithiated tin oxide. Suitable examples of cathode materials include without limitation graphite, aluminum, platinum, palladium, electroactive transition metal oxides comprising lithium or sodium, indium tin oxide, and conducting polymers such as polypyrrole and polyvinylferrocene.

The porous separator serves to prevent short circuiting between the anode and the cathode. The porous separator typically consists of a single-ply or multi-ply sheet of a microporous polymer such as polyethylene, polypropylene, polyamide, polyimide or a combination thereof. The pore size of the porous separator is sufficiently large to permit transport of ions to provide ionically conductive contact between the anode and the cathode, but small enough to prevent contact of the anode and cathode either directly or from particle penetration or dendrites which can form on the anode and cathode. Examples of porous separators suitable for use herein are disclosed in U.S. application Ser. No. 12/963,927 (filed 9 Dec. 2010, U.S. Patent Application Publication No. 2012/0149852, now U.S. Pat. No. 8,518,525).

Many different types of materials are known that can function as the anode or the cathode. In some embodiments, the cathode can include, for example, cathode electroactive materials comprising lithium and transition metals, such as $LiCoO_2$, $LiNiO_2$, $LiMn_2O_4$, $LiCo_{0.2}Ni_{0.2}O_2$, $LiV_3O_8$, $LiNi_{0.5}Mn_{1.5}O_4$; $LiFePO_4$, $LiMnPO_4$, $LiCoPO_4$, and $LiVPO_4F$. In other embodiments, the cathode active materials can include, for example:

$Li_aCoG_bO_2$, where $0.90 \leq a \leq 1.8$, and $0.001 \leq b \leq 0.1$;

$Li_aNi_bMn_cCo_dR_eO_{2-f}Z_f$, where $0.8 \leq a \leq 1.2$, $0.1 \leq b \leq 0.9$, $0.0 \leq c \leq 0.7$, $0.05 \leq d \leq 0.4$, $0 \leq e \leq 0.2$, wherein the sum of b+c+d+e is about 1, and $0 \leq f \leq 0.08$;

$Li_aA_{1-b}R_bD_2$, where $0.90 \leq a \leq 1.8$ and $0 \leq b \leq 0.5$;

$Li_aE_{1-b}R_bO_{2-c}D_c$, where $0.90 \leq a \leq 1.8$, $0 \leq b \leq 0.5$ and $0 \leq c \leq 0.05$;

$Li_aNi_{1-b-c}Co_bR_cO_{2-d}Z_d$, where $0.9 \leq a \leq 1.8$, $0 \leq b \leq 0.4$, $0 \leq c \leq 0.05$, and $0 \leq d \leq 0.05$;

$Li_{1-z}Ni_{1-x-y}Co_xAl_yO_2$, where $0 < x < 0.3$, $0 \leq y < 0.1$, and $0 < z < 0.06$.

In the above chemical formulas, A is Ni, Co, Mn, or a combination thereof; D is O, F, S, P, or a combination thereof; E is Co, Mn, or a combination thereof; G is Al, Cr, Mn, Fe, Mg, La, Ce, Sr, V, or a combination thereof; R is Al, Ni, Co, Mn, Cr, Fe, Mg, Sr, V, Zr, Ti, a rare earth element, or a combination thereof; Z is F, S, P, or a combination thereof. Suitable cathodes include those disclosed in U.S. Pat. Nos. 5,962,166; 6,680,145; 6,964,828; 7,026,070; 7,078,128; 7,303,840; 7,381,496; 7,468,223; 7,541,114; 7,718,319; 7,981,544; 8,389,160; 8,394,534; and 8,535,832, and the references therein. By "rare earth element" is meant the lanthanide elements from La to Lu, and Y and Sc.

In another embodiment the cathode material is an NMC cathode; that is, a LiNiMnCoO cathode, more specifically, cathodes in which the atomic ratio of Ni:Mn:Co is 1:1:1 ($Li_aNi_{1-b-c}Co_bR_cO_{2-d}Z_d$ where $0.98 \leq a \leq 1.05$, $0 \leq d \leq 0.05$, b=0.333, c=0.333, where R comprises Mn); or the atomic ratio of Ni:Mn:Co is 5:3:2 ($Li_aNi_{1-b-c}Co_bR_cO_{2-d}Z_d$ where $0.98 \leq a \leq 1.05$, $0 \leq d \leq 0.05$, c=0.3, b=0.2, where R comprises Mn).

In another embodiment, the cathode comprises a material of the formula $Li_aMn_bJ_cO_4Z_d$, wherein J is Ni, Co, Mn, Cr, Fe, Cu, V, Ti, Zr, Mo, B, Al, Ga, Si, Li, Mg, Ca, Sr, Zn, Sn, a rare earth element, or a combination thereof; Z is F, S, P, or a combination thereof; and $0.9 \leq a \leq 1.2$, $1.3 \leq b \leq 2.2$, $0 \leq c \leq 0.7$, $0 \leq d \leq 0.4$.

In another embodiment, the cathode in the electrochemical cell or lithium ion battery disclosed herein comprises a cathode active material exhibiting greater than 30 mAh/g capacity in the potential range greater than 4.6 V versus a $Li/Li^+$ reference electrode. One example of such a cathode is a stabilized manganese cathode comprising a lithium-containing manganese composite oxide having a spinel structure as cathode active material. The lithium-containing manganese composite oxide in a cathode suitable for use herein comprises oxides of the formula $Li_xNi_yM_zMn_{2-y-z}O_{4-d}$, wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18; and d is 0 to 0.3. In one embodiment in the above formula, y is 0.38 to 0.48, z is 0.03 to 0.12, and d is 0 to 0.1. In one embodiment in the above formula, M is one or more of Li, Cr, Fe, Co and Ga. Stabilized manganese cathodes may also comprise spinel-layered composites which contain a manganese-containing spinel component and a lithium rich layered structure, as described in U.S. Pat. No. 7,303,840.

In another embodiment, the cathode comprises a composite material represented by the structure of Formula:

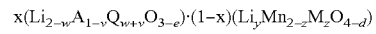

wherein:

x is about 0.005 to about 0.1;

A comprises one or more of Mn or Ti;

Q comprises one or more of Al, Ca, Co, Cr, Cu, Fe, Ga, Mg, Nb, Ni, Ti, V, Zn, Zr or Y;

e is 0 to about 0.3;

v is 0 to about 0.5.

w is 0 to about 0.6;

M comprises one or more of Al, Ca, Co, Cr, Cu, Fe, Ga, Li, Mg, Mn, Nb, Ni, Si, Ti, V, Zn, Zr or Y;

d is 0 to about 0.5;
y is about 0 to about 1; and
z is about 0.3 to about 1; and
wherein the $Li_yMn_{2-z}M_zO_{4-d}$ component has a spinel structure and the $Li_{2-w}Q_{w+v}A_{1-v}O_{3-e}$ component has a layered structure.

In the above formula, x can be preferably about 0 to about 0.1.

In another embodiment, the cathode in the lithium ion battery disclosed herein comprises $Li_aA_{1-x}R_xDO_{4-f}Z_f$,
wherein:
A is Fe, Mn, Ni, Co, V, or a combination thereof;
R is Al, Ni, Co, Mn, Cr, Fe, Mg, Sr, V, Zr, Ti, a rare earth element, or a combination thereof;
D is P, S, Si, or a combination thereof;
Z is F, Cl, S, or a combination thereof;
$0.8 \leq a \leq 2.2$;
$0 \leq x \leq 0.3$; and
$0 \leq f \leq 0.1$.

In another embodiment, the cathode in the lithium ion battery ore electrochemical cell disclosed herein comprises a cathode active material which is charged to a potential greater than or equal to about 4.1 V, or greater than or equal to 4.35 V, or greater than 4.5 V, or greater than or equal to 4.6 V versus a Li/Li$^+$ reference electrode. Other examples are layered-layered high-capacity oxygen-release cathodes such as those described in U.S. Pat. No. 7,468,223 charged to upper charging potentials above 4.5 V.

In some embodiments, the cathode comprises a cathode active material exhibiting greater than 30 mAh/g capacity in the potential range greater than 4.6 V versus a Li/Li$^+$ reference electrode, or a cathode active material which is charged to a potential greater than or equal to 4.35 V versus a Li/Li$^+$ reference electrode.

A cathode active material suitable for use herein can be prepared using methods such as the hydroxide precursor method described by Liu et al (J. Phys. Chem. C 13:15073-15079, 2009). In that method, hydroxide precursors are precipitated from a solution containing the required amounts of manganese, nickel and other desired metal(s) acetates by the addition of KOH. The resulting precipitate is oven-dried and then fired with the required amount of LiOH·H2O at about 800 to about 1000° C. in oxygen for 3 to 24 hours. Alternatively, the cathode active material can be prepared using a solid phase reaction process or a sol-gel process as described in U.S. Pat. No. 5,738,957 (Amine).

A cathode, in which the cathode active material is contained, suitable for use herein may be prepared by methods such as mixing an effective amount of the cathode active material (e.g. about 70 wt % to about 97 wt %), a polymer binder, such as polyvinylidene difluoride, and conductive carbon in a suitable solvent, such as N-methylpyrrolidone, to generate a paste, which is then coated onto a current collector such as aluminum foil, and dried to form the cathode.

An electrochemical cell or lithium ion battery as disclosed herein further contains an anode, which comprises an anode active material that is capable of storing and releasing lithium ions. Examples of suitable anode active materials include, for example, lithium alloys such as lithium-aluminum alloy, lithium-lead alloy, lithium-silicon alloy, and lithium-tin alloy; carbon materials such as graphite and mesocarbon microbeads (MCMB); phosphorus-containing materials such as black phosphorus, MnP$_4$ and CoP$_3$; metal oxides such as SnO$_2$, SnO and TiO$_2$; nanocomposites containing antimony or tin, for example nanocomposites containing antimony, oxides of aluminum, titanium, or molybdenum, and carbon, such as those described by Yoon et al (*Chem. Mater.* 21, 3898-3904, 2009); and lithium titanates such as Li$_4$Ti$_5$O$_{12}$ and LiTi$_2$O$_4$. In one embodiment, the anode active material is lithium titanate or graphite. In another embodiment, the anode is graphite.

An anode can be made by a method similar to that described above for a cathode wherein, for example, a binder such as a vinyl fluoride-based copolymer is dissolved or dispersed in an organic solvent or water, which is then mixed with the active, conductive material to obtain a paste. The paste is coated onto a metal foil, preferably aluminum or copper foil, to be used as the current collector. The paste is dried, preferably with heat, so that the active mass is bonded to the current collector. Suitable anode active materials and anodes are available commercially from companies such as Hitachi, NEI Inc. (Somerset, NJ), and Farasis Energy Inc. (Hayward, CA).

The electrochemical cell as disclosed herein can be used in a variety of applications. For example, the electrochemical cell can be used for grid storage or as a power source in various electronically powered or assisted devices ("Electronic Device") such as a computer, a camera, a radio, a power tool, a telecommunications device, or a transportation device (including a motor vehicle, automobile, truck, bus or airplane). The present disclosure also relates to an electronic device, a transportation device, or a telecommunication device comprising the disclosed electrochemical cell.

In another embodiment, there is provided a method for forming an electrolyte composition. The method comprises combining a) a fluorinated solvent as defined herein above; b) lithium bis(fluorosulfonyl)imide, and c) at least one electrolyte salt to form the electrolyte composition. The components can be combined in any suitable order. The step of combining can be accomplished by adding the individual components of the electrolyte composition sequentially or at the same time. In some embodiments, the components a) and b) are combined to make a first solution. After the formation of the first solution, an amount of the electrolyte salt is added to the first solution in order to produce the electrolyte composition having the desired concentration of electrolyte salt. Alternatively, the components a) and c) are combined to make a first solution, and after the formation of the first solution an amount of the at least one silyl oxalate is added to produce the electrolyte composition. Typically, the electrolyte composition is stirred during and/or after the addition of the components in order to form a homogeneous mixture.

In another embodiment, the use of lithium bis(fluorosulfonyl)imide for improving cycle performance at low and high temperature, and/or storage performance at high temperature, of a lithium ion battery, wherein the lithium bis(fluorosulfonyl)imide is used in combination with a fluorinated solvent as defined herein above, is a subject-matter of the invention. There is disclosed a method for improving cycle performance at low and high temperature, and/or storage performance at high temperature, of a lithium ion battery, wherein said method comprises the step of incorporating lithium bis(fluorosulfonyl)imide in an electrolyte composition comprising a fluorinated solvent and at least one electrolyte salt.

The disclosure of all patent applications, and publications cited herein are hereby incorporated by reference, to the extent that they provide exemplary, procedural or other details supplementary to those set forth herein. Should the disclosure of any of the patents, patent applications, and publications that are incorporated herein by reference conflict with the present specification to the extent that it might render a term unclear, the present specification shall take precedence.

Each and every claim is incorporated into the specification as an embodiment of the present invention. Thus, the claims are a further description and are an addition to the preferred embodiments of the present invention.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention.

Accordingly, the scope of protection is not limited by the description set out above, but is only limited by the claims which follow, that scope including all equivalents of the subject matter of the claims.

EXAMPLES

The present invention is further defined in the following examples. It should be understood that these examples, while indicating preferred embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various uses and conditions.

The meaning of abbreviations used is as follows: "° C." means degrees Celsius; "g" means gram(s), "mg" means milligram(s), "µg" means microgram(s), "L" means liter(s), "mL" means milliliter(s), "µL" means microliter(s), "mol" means mole(s), "mmol" means millimole(s), "M" means molar concentration, "wt %" means percent by weight, "mm" means millimeter(s), "µm" means micrometer(s), "ppm" means parts per million, "h" means hour(s), "min" means minute(s), "psig" means pounds per square inch gauge, "kPa" means kiloPascal(s), "A" means amperes, "mA" mean milliampere(s), "mAh/g" mean milliamperes hour(s) per gram, "V" means volt(s), "xC" refers to a constant current which is the product of x and a current in A which is numerically equal to the nominal capacity of the battery expressed in Ah, "rpm" means revolutions per minute, "Ex" means Example, "LiPF$_6$" means lithium hexafluorophosphate, "FEC" means monofluoroethylene carbonate, "DFEA" means 2,2-difluoroethyl acetate, "LiFSI" means Lithium bis(fluorosulfonyl)imide, "NMC532" means LiNi$_{5/10}$Mn$_{3/10}$Co$_{2/10}$O$_2$, "SOC" means state of charge, "DC-IR" means direct current internal resistance and refers to the resistance of current flowing through the battery.

Electrolyte Preparation

The electrolyte was prepared by combining 2,2-difluoroethyl acetate (DFEA, Solvay) fluoroethylene carbonate (FEC, Solvay) in a 75:25 weight ratio in a Argon gas purged dry box. Molecular sieves (3A) were are added and the mixture was dried to less than 1 ppm water and filtered through a 0.45 micron PTFE syringe filter.

88.68 g of the mixture described above was combined with 11.32 g of LiPF$_6$ (Enchem) and with a variable amount of LiFSI. The material was gently agitated to dissolve the components and prepare the final formulation.

Five electrolyte formulations were prepared according to Table 1:

TABLE 1

| | Li-salt | Solvent | Additive |
| --- | --- | --- | --- |
| Reference | 1M LiPF$_6$ | DFEA/FEC (75:25) | — |
| Ex. 1 | 1M LiPF$_6$ | DFEA/FEC (75:25) | LiFSI 1 wt. % |
| Ex. 2 | 1M LiPF$_6$ | DFEA/FEC (75:25) | LiFSI 3 wt. % |
| Ex. 3 | 1M LiPF$_6$ | DFEA/FEC (75:25) | LiFSI 5 wt. % |
| Ex. 4 | 1M LiPF$_6$ | DFEA/FEC (75:25) | LiFSI 10 wt. % |

Preparation of the Pouch Cells

Pouch cells were purchased from Pred Materials (New York, N.Y.) and were 600 mAh cells containing an NMC532 cathode and a graphitic anode.

Before use, the pouch cells were dried in the antechamber of a dry box under vacuum 4 days at 55° C. and vacuum −100 kPa. Approximately 2.0 gram of an electrolyte composition was injected through the bottom, and the bottom edge sealed in a vacuum sealer. For each example, two pouch cells are prepared using the same electrolyte composition.

Pouch Cells Assembly and Formation

The cells were held in an environmental chamber (model BTU-433, Espec North America, Hudsonville, Michigan) and evaluated using a battery tester (Series 4000, Maccor, Tulsa, OK) for the formation procedures (at 25° C., 60° C.) and the high temperature cycling (at 45° C.).

The pouch cells were conditioned using the following cycling procedure. In a first cycle, the cell is charged for 3 hours at 0.1 C, corresponding to approximately 30% state of charge; this is followed by 24 hour rest at 60° C. The pouch cell is degassed and resealed in a vacuum sealer. The cell is pressed using hot press at 70° C. during 3 sec. For the second cycle, the cell is charged at constant current (CC charge) of 0.5 C to 4.35V followed by a CV voltage-hold step at 4.35V until current dropped below 0.05 C and rested 10 min. This is followed by a CC discharge at 0.5 C to 3.0V and rested 10 min. This cycle is repeated 3 times and it is used as a check of the capacity of the cell. The final step for formation of pouch cell is charged at constant current (CC charge) of 0.5 C to SOC30.

For the 25° C. cycles and the 45° C. cycling described below, the cells also have a 10 min rest following each charge and each discharge step.

Cycling Method

The cells were placed in an environmental chamber at 25° C. and 45° C. and cycled: CC charge 1 C to 4.35V and CV charge to 0.05 C, and CC discharge at 1 C to 3.0V.

Storage Procedure

The cells were placed in an environmental chamber at 70° C. with SOC100, CC charge 1 C to 4.35V and CV charge to 0.05 C, initial thickness checked. After 1 week, they were put out from oven, the thickness was measured by Vernier calipers, the residual and recovery capacity was measured with CC discharge at 1 C to 3.0V, and DC-IR is checked.

Ionic Conductivity Measure Procedure

The ionic conductivity of the electrolytes was measured by LCR meter in temperature control chamber.

RESULTS

Figure 2:
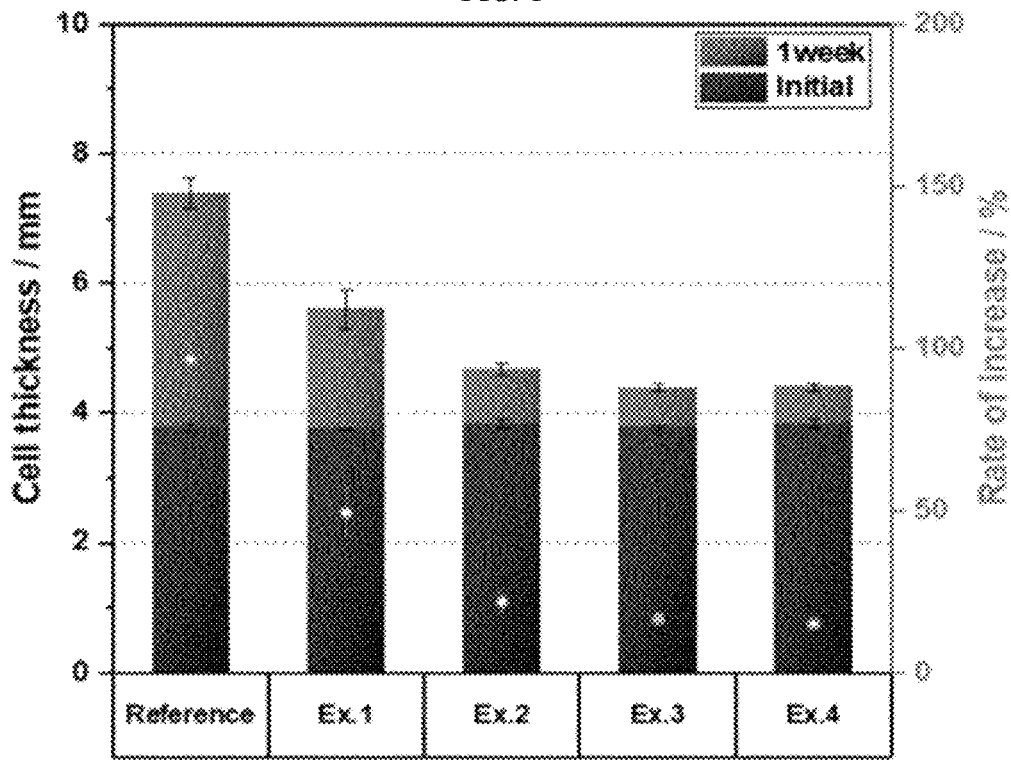
FIG. 2 shows the results of the storage performance tests (swelling) of the cells according to the examples.
Figure 3:
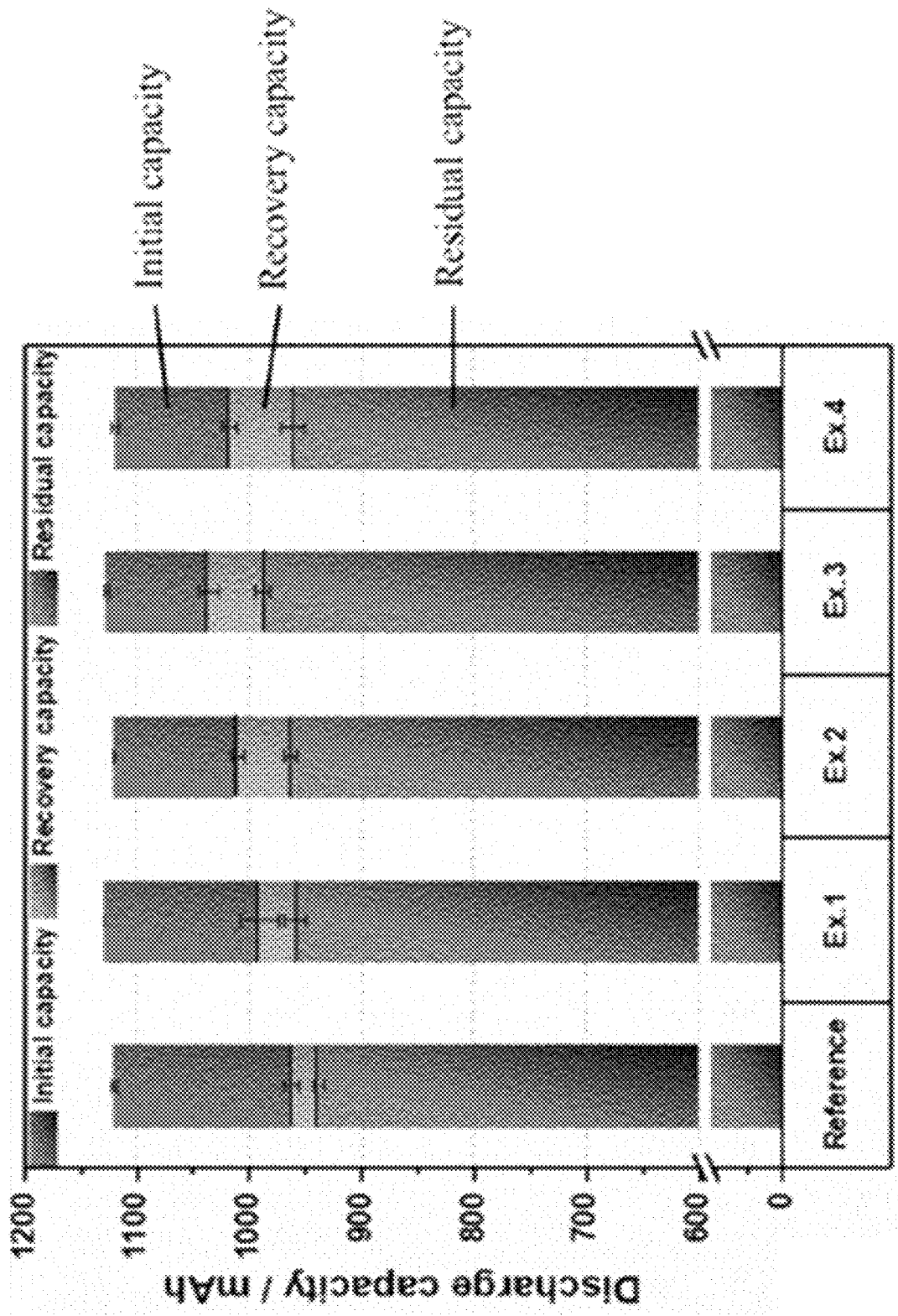
FIG. 3 shows the results of the storage performance tests (recovery capacity) of the cells according to the examples.

Some results are summarized in Table 2, and represented in the FIGS. 1, 2 and 3:

TABLE 2

|  | Reference | Ex. 1 | Ex. 2 | Ex. 3 | Ex. 4 |
|---|---|---|---|---|---|
| 25° C. Cycling (capacity retention @900 cycles) | 99.4% | 100.9% | 100.2% | 99.7% | 96.1% |
| 45° C. Cycling (nb of cycles @80% capacity) | 498 | 757 | 706 | 667 | 517 |
| Swelling (after 70° C., 1 week storage) | 96.6% | 49.3% | 21.8% | 16.6% | 15.0% |
| Residual capacity (after 70° C., 1 week storage) | 83.8% | 84.9% | 86.0% | 87.7% | 85.9% |
| Recovery capacity (after 70° C., 1 week storage) | 86.0% | 87.8% | 90.2% | 92.0% | 90.9% |

The tests show that the cells containing the electrolytes according to the invention comprising LiFSI have improved cycle performance at low and high temperature. Additionally, the cells containing the electrolytes according to the invention comprising LiFSI have improved storage performance at high temperature.

The invention claimed is:

1. An electrolyte composition comprising:
   from 50 to about 80% by weight of a fluorinated solvent,
   lithium bis (fluorosulfonyl) imide (LiFSI), in an amount of from 0.3% to about 5.0% by weight, based on the total weight of the electrolyte composition;
   at least one linear or cyclic organic carbonate, that is fluorinated or non-fluorinated in an amount of from about 20% to about 40% by weight of the electrolyte composition; and
   a main electrolyte different from LiFSI and in a greater amount than LiFSI, at a concentration ranging from 0.5 to 1.2M, and selected from the group consisting of lithium hexafluorophosphate (LiPF$_6$), lithium bis (trifluoromethanesulfonyl) imide, lithium bis (perfluoroethanesulfonyl) imide, lithium (fluorosulfonyl) (nonafluorobutanesulfonyl) imide, lithium tetrafluoroborate, lithium perchlorate, lithium hexafluoroarsenate, lithium trifluoromethanesulfonate, lithium tris (trifluoromethanesulfonyl) methide, Li$_2$B$_{12}$F$_{12-x}$H$_x$ where x is equal to 0 to 8, mixtures of lithium fluoride and anion receptor B (OC$_6$F$_5$)$_3$ and mixtures thereof,
   wherein the fluorinated solvent is an acyclic carboxylic acid esters represented by the formula:

R$^1$—COO—R$^2$ wherein
   i) R$^1$ is an alkyl group;
   ii) R$^2$ is a fluoroalkyl group; and
   iii) R$^1$ and R$^2$, taken as a pair, comprise at least two carbon atoms but not more than seven carbon atoms.

2. The electrolyte composition according to claim 1, wherein LiFSI is present in the electrolyte composition in the range of from 0.5% to 2.0% by weight, based on the total weight of the electrolyte composition.

3. The electrolyte according to claim 1, wherein the main electrolyte comprises lithium hexafluorophosphate (LiPF$_6$) or lithium bis (trifluoromethanesulfonyl) imide.

4. The electrolyte composition according to claim 1, wherein said organic carbonate is selected from the group consisting of fluoroethylene carbonate, trifluoroethylene carbonate; ethylene carbonate; ethyl methyl carbonate; difluoroethylene carbonate, tetrafluoroethylene carbonate; dimethyl carbonate; diethyl carbonate; propylene carbonate; vinylene carbonate; di-tert-butyl carbonate; 2,2,3,3-tetrafluoropropyl methyl carbonate; bis (2,2,3,3-tetrafluoropropyl) carbonate; bis (2,2,2-trifluoroethyl) carbonate; 2,2,2-trifluoroethyl methyl carbonate; bis (2,2-difluoroethyl) carbonate; 2,2-difluoroethyl methyl carbonate; dipropyl carbonate; methyl propyl carbonate; ethyl propyl vinylene carbonate; methyl butyl carbonate; ethyl butyl carbonate; propyl butyl carbonate; dibutyl carbonate; vinyl ethylene carbonate; dimethylvinylene carbonate; 2,3,3-trifluoroallyl methyl carbonate; and isomers and mixtures thereof.

5. The electrolyte composition according to claim 1, wherein said one or more organic carbonate is present in the electrolyte composition in the range of from about 25% to about 35% by weight of the electrolyte composition.

6. The electrolyte composition according to claim 1, wherein the electrolyte composition further comprises an additive.

7. The electrolyte composition according to claim 6, wherein the additive is a lithium boron compound, a cyclic sultone, a cyclic sulfate, a cyclic carboxylic acid anhydride or a combination thereof.

8. The electrolyte composition according to claim 1, wherein the fluorinated solvent is selected from the group consisting of 2,2-difluoroethyl acetate, 2,2,2-trifluoroethyl acetate, 2,2-difluoroethyl propionate, 3,3-difluoropropyl acetate, 3,3-difluoropropyl propionate, and mixtures thereof.

9. The electrolyte composition according to claim 8, wherein the fluorinated solvent is selected from the group consisting of 2,2-difluoroethyl acetate, 2,2-difluoroethyl propionate, 2,2,2-trifluoroethyl acetate, and mixtures thereof.

10. The electrolyte composition according to claim 9, wherein the fluorinated solvent is 2,2-difluoroethyl acetate.

11. An electrochemical cell comprising:
   (a) a housing;
   (b) an anode and a cathode disposed in the housing and in ionically conductive contact with one another;
   (c) electrolyte composition according to claim 1.

12. An electronic device, transportation device, or telecommunications device, comprising an electrochemical cell according to claim 11.

13. A method for forming an electrolyte composition according to claim 1, wherein said method comprises combining the fluorinated solvent; LiFSI, the linear or cyclic organic carbonate, that is fluorinated or non-fluorinated, and the electrolyte salt to form the electrolyte composition.

14. A method for improving cycle performance, and/or storage performance, of a lithium ion battery, wherein said method comprises the step of incorporating LiFSI in an amount of from 0.3% to about 5.0% by weight, based on the total weight of an electrolyte composition in an electrolyte composition comprising from 50% by weight to about 80% by weight of a fluorinated solvent, at least one linear or cyclic organic carbonate in an amount of from about 20% to about 40% by weight, based on the total weight of the electrolyte composition, and a main electrolyte different from LiFSI and in a greater amount than LiFSI, at a concentration ranging from 0.5 to 1.2 M and, selected from the group consisting of lithium hexafluorophosphate ($LiPF_6$), lithium bis (trifluoromethanesulfonyl) imide, lithium bis (perfluoroethanesulfonyl) imide, lithium (fluorosulfonyl) (nonafluorobutanesulfonyl) imide, lithium tetrafluoroborate, lithium perchlorate, lithium hexafluoroarsenate, lithium trifluoromethanesulfonate, lithium tris (trifluoromethanesulfonyl) methide, $Li_2B_{12}F_{12-x}H_x$ where x is equal to 0 to 8, and mixtures of lithium fluoride and anion receptor $B\ (OC_6F_5)_3$ and mixtures thereof.

\* \* \* \* \*